United States Patent [19]
Tanaka et al.

[11] Patent Number: 5,384,905
[45] Date of Patent: Jan. 24, 1995

[54] METHOD FOR TRACING A LINE IMAGE BY MONITORING THE DISTANCE BETWEEN TWO TRACE BASE POINTS

[75] Inventors: Yutaka Tanaka; Naruto Takasaki, both of Yokohama, Japan

[73] Assignee: Hitachi Software Engineering Co., Ltd., Kanagawa, Japan

[21] Appl. No.: 907,036

[22] Filed: Jul. 1, 1992

[30] Foreign Application Priority Data

Jul. 2, 1991 [JP] Japan ................................ 3-161652

[51] Int. Cl.$^6$ .............................................. G06F 15/62
[52] U.S. Cl. .................................. 395/143; 395/142; 395/150; 382/55
[58] Field of Search .................... 395/140–143, 395/150, 151, 161; 364/474.24; 382/22, 24, 55, 60

[56] References Cited

U.S. PATENT DOCUMENTS

| | | | |
|---|---|---|---|
| 4,319,331 | 3/1982 | Elbaum et al. | 395/142 X |
| 4,368,462 | 1/1983 | Crawley | 345/189 |
| 4,620,287 | 10/1986 | Yam | 395/142 |
| 4,905,166 | 2/1990 | Schuerman | 395/142 |
| 4,975,853 | 12/1990 | Shimizu et al. | 364/474.24 |

FOREIGN PATENT DOCUMENTS

281271 9/1988 European Pat. Off. .... G06K 11/02

*Primary Examiner*—Almis Jankus
*Attorney, Agent, or Firm*—Fay, Sharpe, Beall, Fagan, Minnich & McKee

[57] ABSTRACT

An image processor includes an image memory for storing image data; a data memory for storing graphic data; a display unit for displaying the image data and the graphic data; an input unit for giving an instruction to trace; and a semi-automatic image trace processing section for processing the line image of the image data. Two points on the contours at both sides of line image are set as trace base points for the line image, and the line image is traced, while determining end points and branch points, by moving the two trace base points on the contours at both sides of the line image concurrently in the same directions, while monitoring a relationship between the two trace base points and absorbing some noise of the different line widths.

6 Claims, 7 Drawing Sheets

METHOD FOR TRACING A LINE IMAGE BY MONITORING THE DISTANCE BETWEEN TWO TRACE BASE POINTS

BACKGROUND OF THE INVENTION

The present invention relates to a method for tracing a line image in an image processor and, more particularly, to a method for tracing a line image in an image processor such as a CAD (computer-aided design) apparatus, adapted to trace the line image on an interactive basis.

Heretofore, a method for entering drawings written on paper into a graphics processing system has generally involved entering the drawings as image data with an image scanner or the like, displaying the image data on a display through the graphics processing system, and tracing the image data manually through a pointing device or the like by the operator.

For example, a conventional method for entering drawings on an interactive basis, as described in Japanese Patent Laid-open Publication (Kokai) No. 269,276/1987, involves entering the drawings into a computer through a scanner as image data, displaying the image data on the display screen so as to be superimposed on center line image data, and entering the drawings as vector data by indicating the necessary positions on the drawings displayed on the display screen through a coordinate indicator.

As described hereinabove, for example, when the image data are converted into graphic data such as vector data, center data of the center (or the center line) of the image are determined and data on necessary characteristic points of the image, such as end points, branch points, corner points, and the like, from the continuous center line of the center data are selected, specified and entered. In entering the characteristic points, the image data are displayed so as to be superimposed on the center data on the display screen in order for the operator to readily determine the characteristic points, and the characteristic points are then entered by instructions to enter by the operator. Hence, this method suffers from the disadvantage that the data on the display screen becomes so complex that the operator may feel it difficult to select necessary data efficiently.

Further, when the image data are converted into graphics data such as vector data, a data image of line graphics may be given from contour data of the image without processing into small lines. This technology is proposed in Japanese Patent Laid-open Publication (Kokai) No. 117,374/1985, entitled "Method for Approximating Polygonal Lines of Line Graphics". In this proposed technology, contour data should be given for all image data in converting the line image from the contour data into line graphics.

In addition, an image processor has been developed which is provided with a semi-automatic image trace processing function so as to trace image points semi-automatically, determine the characteristic points, and enter graphic data on the characteristic points. In converting the line image into line graphics semi-automatic through such a semi-automatically image trace processing function of the image processor, the contour data for the whole drawing are required to be given as a pre-processing for converting the line image into the line graphics from the contour data as in the method for approximating the polygonal lines of line graphics.

When the semi-automatic trace processing of the line image in the image data by the aid of the semi-automatic image trace processing function of such an image processor is applied to image data of a map, the image data to be converted into graphics data by the operator represent roads, configurations of the ground, and the like, and symbols, characters and the like are not required to be converted into the graphics data.

In the trace processing, the operator is required to always pay attention to one location in the semi-automatic image tracing system in which the operator is inquired as to which way to proceed; however, in the method of approximating the polygonal lines of the line graphics, the contour data are required to be given for all the drawings as the pre-processing, so that this method wastes time.

SUMMARY OF THE INVENTION

The object of the present invention is to provide a method of tracing a line image for efficiently performing trace processing in a semi-automatic image trace processing system in an image processor, adapted to trace line image data and convert the line image data into line graphics data.

In order to achieve the aforesaid object, the present invention consists of a method for tracing a line image in an image processor having an image memory for storing image data; a data memory for storing graphic data; a display unit for displaying the image data and the graphic data; an input unit for giving an instruction to trace; and a semi-automatic image trace processing section for the trace processing of the line image of the image data; characterized in that two points on contours at both sides of the line image are set as trace base points for the line image; a relationship between the two trace base points is monitored while moving the two points on the contour concurrently in the same directions; and the line image having a line width identical to or smaller than a predetermined line width is traced.

This arrangement allows the semi-automatic image trace processing section equipped in the image processor to trace the line image having a line width identical to or smaller than the predetermined line width by monitoring the relationship between the two trace base points while moving on the contour concurrently in the same directions, when an instruction to trace the line image as the object of tracing is entered and the points are given on the contours at both sides of the line image as trace base points for tracing the line image.

The trace base points are set by specifying a position, in the vicinity of line pixels of the line image of the image data, as the object of tracing, as a start point, searching for a change point which changes pixels on the contour of the line image from the start point, and determining the trace base points of the line image of the image data on both contours from the change point on the contour of the line image. The relationship between the two trace base points is determined by tracing them along and on the contours, and a middle point between the two trace base points is registered as a tracing point for tracing the line image.

If the two trace base points would intersect each other, the intersecting point that intersects the two trace base points is registered as an end point in tracing the line image by tracing the two trace base points along and on the contours and determining the relationship between the two trace base points. If it is found as a result of the determination of the relationship between the two trace base points in tracing the two trace base points that a distance between the two trace base points exceeds a predetermined value, the tracing of the two trace base points along and on the contours is temporarily suspended and one of the trace base points is moved in a predetermined range with the point of suspension set as the center of movement. In this case, if the distance between the two trace base points would not exceed the predetermined value, the movement of the two trace base points is continued as it is. This processing can absorb noises of an image that varies its line width and permits a continuation of the trace processing of the line image.

On the other hand, the point of tracing the line image is registered as a branch point if a distance between the two trace base points becomes longer than the predetermined value when one of the two trace base points is moved within the predetermined range from the point of suspension at which the tracing of the two trace base points along and on the contours has temporarily been suspended when it was found that the distance between the two trace base points exceeds the predetermined value, as a result of the determination of the relationship between the two trace base points while tracing the two trace base points along and on the contours. This can allow the branch point to be determined as the two trace base points are being traced.

In addition, when the intersecting point is registered as the end point by tracing the two trace base points along and on the contours, determining the relationship therebetween, and determining that the two trace base points intersect each other, a square search window is set so as to have each of the four sides having a predetermined length with the end point located at the center of the window. Further, it is decided to determine if another line image exists within the search window. If it is decided that another line image exists within the search window, then two new trace base points are set on the contours at both sides of the other line image and they are connected to the previous trace base points, thereby continuing the tracing of the new trace base points along and on the contours. This arrangement can continue the tracing of the line image even if the line image is disconnected.

As described hereinabove, the tracing method according to the present invention can permit efficient trace processing because no pre-processing of the whole image is required in tracing the line image and because appropriate measures can be taken for each of the trace processing operations by monitoring the state of the line image while continuing the tracing of the line image. Further, the tracing method according to the present invention can determine the end points and the branch points while tracing the two trace base points along and on the contours, so that the operator can decide the tracing path, and the original function of the semi-automatic image trace processing can be realized with high efficiency.

DETAILED DESCRIPTION OF THE PREFERRED EMBODIMENTS

A description will be made of an embodiment of the present invention with reference to the accompanying drawings.

Figure 1:
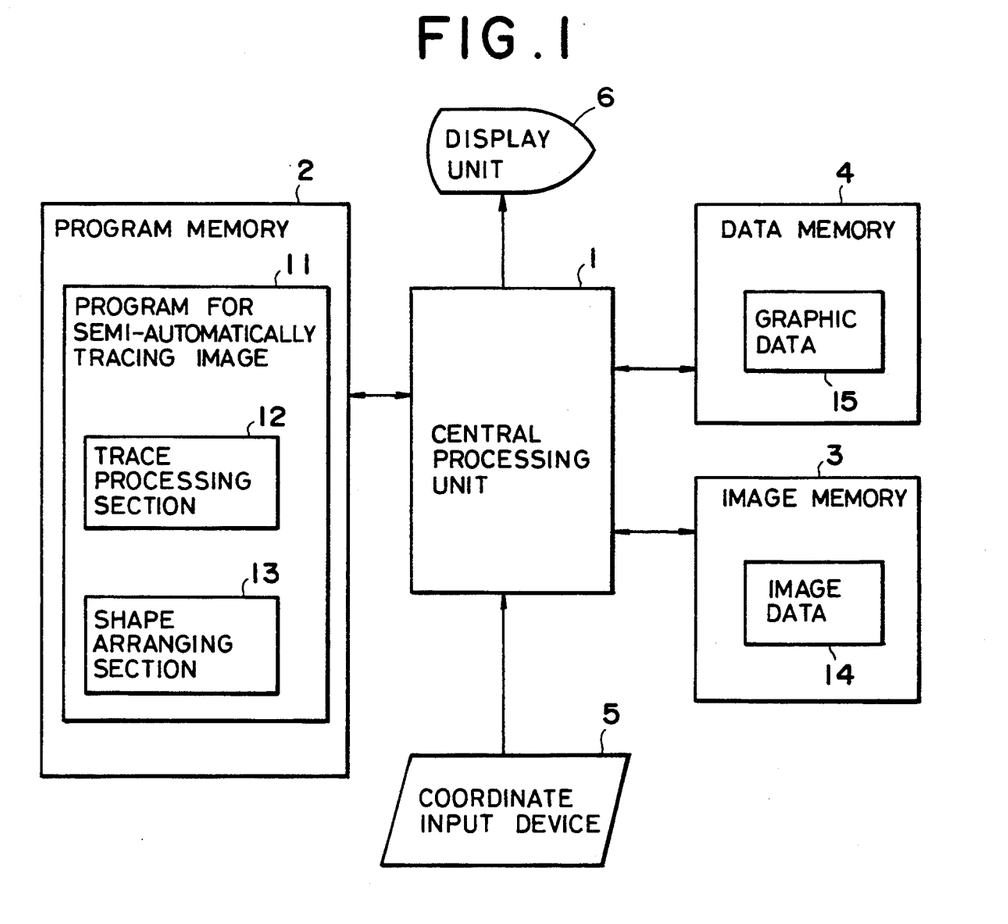
FIG. 1 is a block diagram showing a system configuration of an image processor according to an embodiment of the present invention.

FIG. 1 is a block diagram showing a system configuration for the image processor according to an embodiment of the present invention. The image processor comprises a central processing unit 1 for performing various program processing, a program memory 2 for storing programs necessary for the operation of the central processing unit 1, an image memory 3, a data memory 4, a coordinates input device 5, and a display unit 6 for providing a display on a screen.

The program memory 2 stores a semi-automatic image tracing program 11 which in turn contains subprograms contained in a trace processing section 12 for performing the trace processing of a line image and in a shape arranging section 13 for arranging trace results and converting them into graphic data. In the image memory 3 are stored image data 14 containing line images to be traced, and the data memory 4 stores graphic data 15 which have been converted into graphic data as vector data and digitized.

Coordinate input device 5 may be a pointing device such as a mouse, trace ball or the like. The coordinate value data are entered for the position of a cursor on the display screen of the display unit 6. The coordinate input device 5 may have direct outputs to the display screen of the display unit 6 and it may be employed as an interactive input device for entering an instruction from the operator.

For the image processor having the configuration as described hereinabove, the trace processing section 12 of the semi-automatic image tracing program 11 is adapted to perform the trace processing for tracing a line of continuous black pixels for the line image of the image data 14 stored in the image memory 3. The trace processing of the line image at the trace processing section 12 is started semi-automatically by displaying the line image of the image data as the object of tracing on the display screen of the display unit 6, and by specifying the image to be traced and entering the instruction to trace through the coordinate input device 5. In the trace processing of the line image, two points are determined on the contours at both sides of the line image to be traced, and the middle point between the two points is registered as the tracing point by moving the two points in the same directions along and on the contours of the line image.

The two points can be traced along and on the contours while absorbing variations in the line widths of the line image as image noise even for a line image having line widths narrower than a predetermined line width. Further, the end points and the branch points can be determined for the line image which is being traced by monitoring the relationship between the two points, so that requested measures for dealing with the end points and the branch points can be selected by the operator on an interactive basis. Hence, the line image tracing can be performed with better results and higher efficiency in an interactive-type image conversion system of a semi-automatic image tracing type. In addition, the line image tracing method according to the present invention can trace a discontinuous line image by jumping the disconnected portion of the line image.

A description will be made of the line image trace processing in accordance with the flowchart of FIG. 2 with reference to FIGS. 3, 4, 5 and 6. It is noted herein that the image of the image data 14 displayed on the display screen of the display unit 6 contains a line image, and that the line image 31, as shown for example in FIG. 3, is an expansion of the line image comprising the image data 14, and the line image 31 is subjected to line image trace processing.

First, at step 201, a point P is specified in the vicinity of the line image 31, and two points L0 and R0 are given as trace base points on the contours at both sides of the line image 31 in positions nearby the point P specified.

Then, at step 202, it is determined if a distance between the trace base points L0 and R0 is smaller than a predetermined line width $\epsilon$. When it is decided at step 202 that the distance between the trace base points L0 and R0 is larger than the predetermined line width $\epsilon$, then the line image trace processing is suspended because the image intended to be traced is not a line image to be traced. On the other hand, when it is decided at step 202 that the distance between the trace base points L0 and R0 is smaller than the predetermined line width $\epsilon$, then the program flow goes to step 203 at which a middle point C0 between the trace base points L0 and R0 is registered as a tracing point for tracing the line image and as graphic data 15 in the data memory 4, followed by step 204 at which a counter variable i is set to 1.

Figure 3:
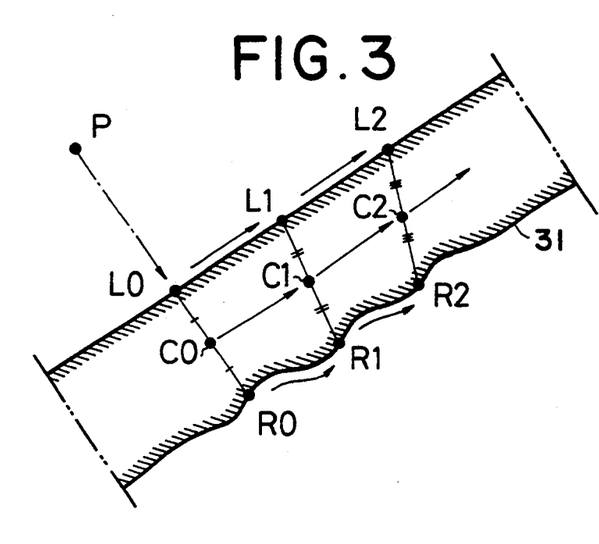
FIG. 3 is a schematic representation describing an example of setting trace base points and points for tracing the line image in the line image trace processing.
Figure 4:
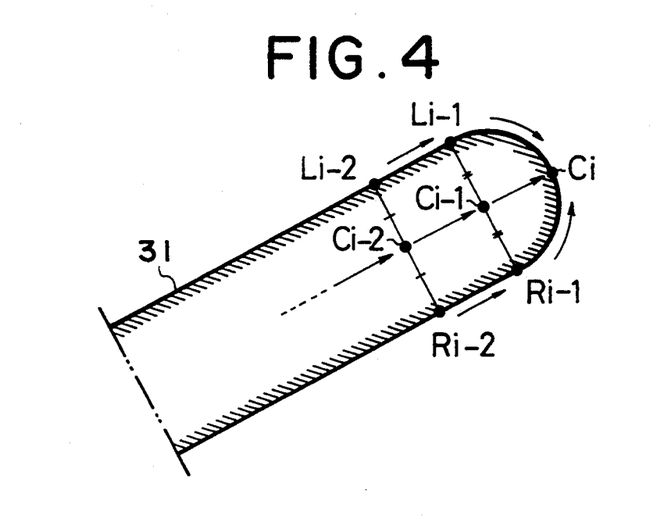
FIG. 4 is a schematic representation describing an example of setting an end point in the line image trace processing.

Then, at step 205, trace base points Li and Ri are determined at both sides of the contours of the line image by moving the trace base points Li-1 and Ri-1 concurrently by a predetermined distance l in the same directions, respectively. In this trace processing, for example, as shown in FIG. 3, the trace base points L0 and R0 are moved concurrently in the same directions on the contours up to the next trace base points L1 and R1, respectively. Then, at step 206, it is determined if the trace base points Li-1 and Ri-1 have intersected each other during their movement. If it is decided at step 206 that they have intersected each other, then the program flow goes to step 207 at which an intersecting point Ci is registered as a tracing point, and then to step 208 at which the intersecting point Ci is regarded as an end point. The trace processing is then suspended, and the end point processing is performed. In the processing of the end point, for example, as shown in FIG. 4, the points Ci-2 and Ci-1 have been registered as the tracing points for tracing the line image in sequential order of the trace processing (as discussed more fully below), and eventually the point Ci is reached. The point Ci is an intersecting point of the trace base points Li-1 and Ri-2, and this intersecting point, i.e. the point Ci, is regarded as an end point.

Figure 5A:
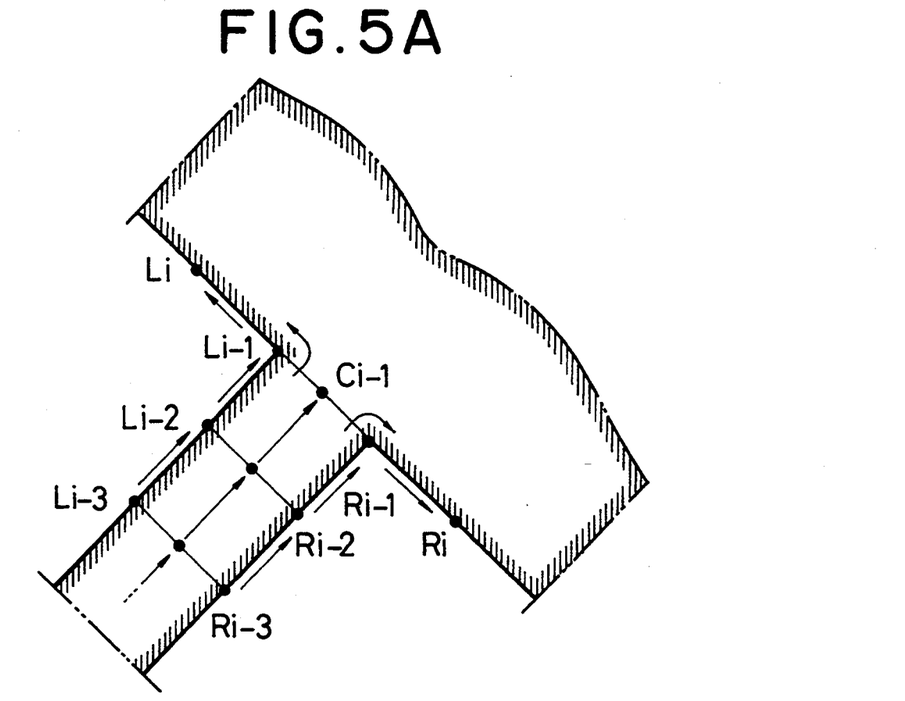
FIGS. 5(A) and 5(B) are schematic representations describing examples of setting branch points in the line image trace processing.
Figure 5B:
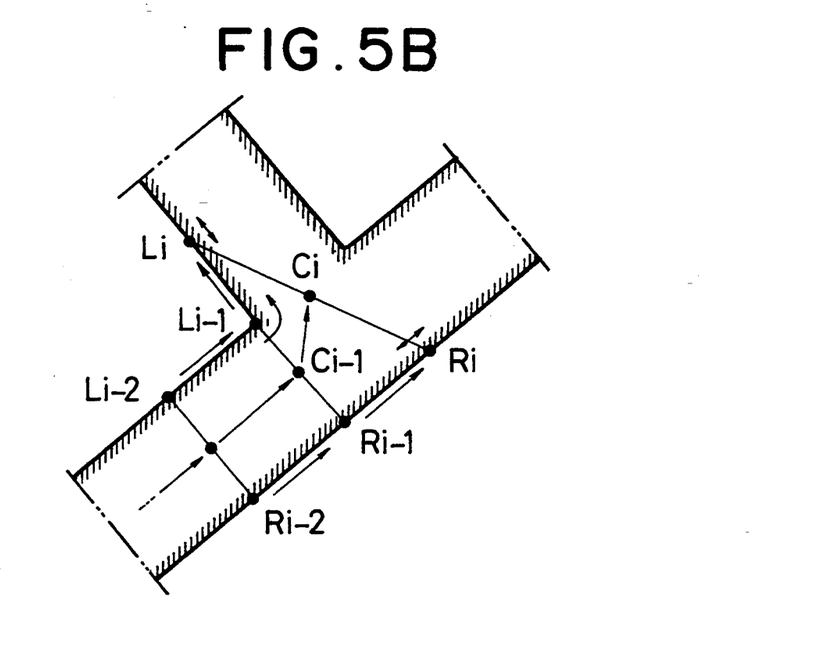
Figure 6:
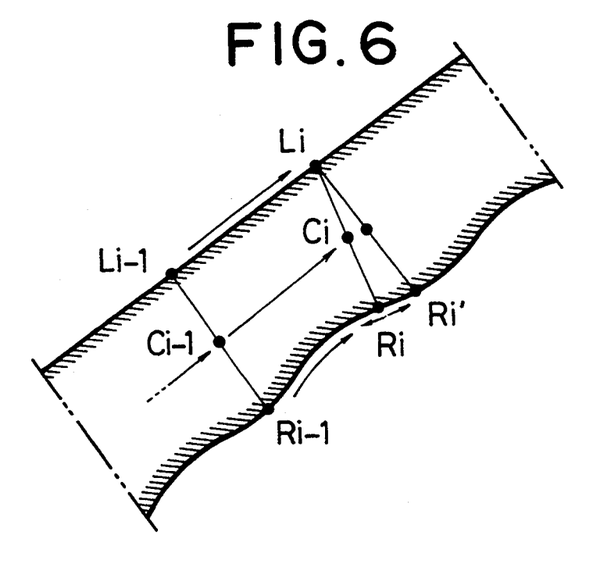
FIG. 6 is a schematic representation describing an example of determining a line width of the line image to be traced in the line image trace processing.

On the other hand, at step 206, when there is no point at which the trace base points Li-1 and Ri-1 intersect each other during their movement of them, then the program flow goes to step 209. At step 209, when it is in turn decided that the distance between the trace base points Li and Ri is larger than the predetermined line width $\epsilon$ set for the line image to be traced, the program flow proceeds to step 210 at which, as shown in FIG. 6, the trace base point Ri is moved on the contour at a predetermined interval in the direction of tracing and in the opposite direction, thereby providing a corrected trace base point Ri'. Then, at step 211, the distance between the trace base point Li and the corrected trace base point Ri' is compared with the predetermined line width $\epsilon$. When it is decided at step 211 that the predetermined line width $\epsilon$ is larger than the distance therebetween, then the program flow goes to step 212 at which the other trace base point Li is processed in the same manner as for trace base point Ri at step 210, thereby providing a corrected trace base point Li'. Then, at step 213, the distance between the trace base point Ri and the corrected trace base point Li' is compared with the predetermined line width $\epsilon$. When the predetermined line width $\epsilon$ is decided at step 213 to be larger than the distance therebetween, then the program flow goes to step 214 at which, as shown in FIG. 5, the point Ci-1 obtained by tracing the line image is registered as a branch point, followed by interrupting the processing and advancing to perform the branch point processing. In the branch point processing, it is decided to determine if the line image as the object of tracing is such a line image, for example, as shown in FIG. 5(A), or if the line image has such a branch point, for example, as shown in FIG. 5(B); followed by the processing of each of the line images so as to comply with the situation involved.

On the other hand, at step 211 or 213, when it is decided that the distance between the trace base point and the corrected trace base point is smaller than the predetermined line width $\epsilon$ set for the line image as the object of tracing, the trace processing of the line image can be continued so that the program flow goes to step 215 at which the middle point between the trace base points Li and Ri is registered as a line image tracing point Ci for tracing the line image.

It is noted herein that the processing at steps 210 and 212 are adapted to absorb certain noises, if any on the contour of the line image and continue the trace processing, for instance, by moving the trace base point Ri on the contour at the predetermined interval in the direction of tracing and in the opposite direction and then providing the corrected trace base point Ri', as shown in FIG. 6. If the corrected trace base point Ri' cannot be provided by moving the trace base point Ri in the direction of tracing and in the opposite direction, the other trace base point Li is processed in substantially the same manner as for the trace base point Ri so that, even if there would be some noise on the contour of the line image, the trace processing can be recovered and continued.

Further, when it is decided at step 209 that the distance between the trace base points Li and Ri is smaller than the predetermined line width ε set for the line image to be traced, then the program flow goes to step 215 at which the middle point between the trace base points Li and Ri is registered as a line image tracing point Ci for tracing the line image. Then, at step 216, a counter variable i is incremented by one, followed by the return to step 205. By repeating the processing as described hereinabove, the line image can be traced one after another. In FIG. 3, points C0, C1, C2, et seq are line image tracing points, as are points Ci-2 and Ci-1 in FIG. 4.

Figure 2:
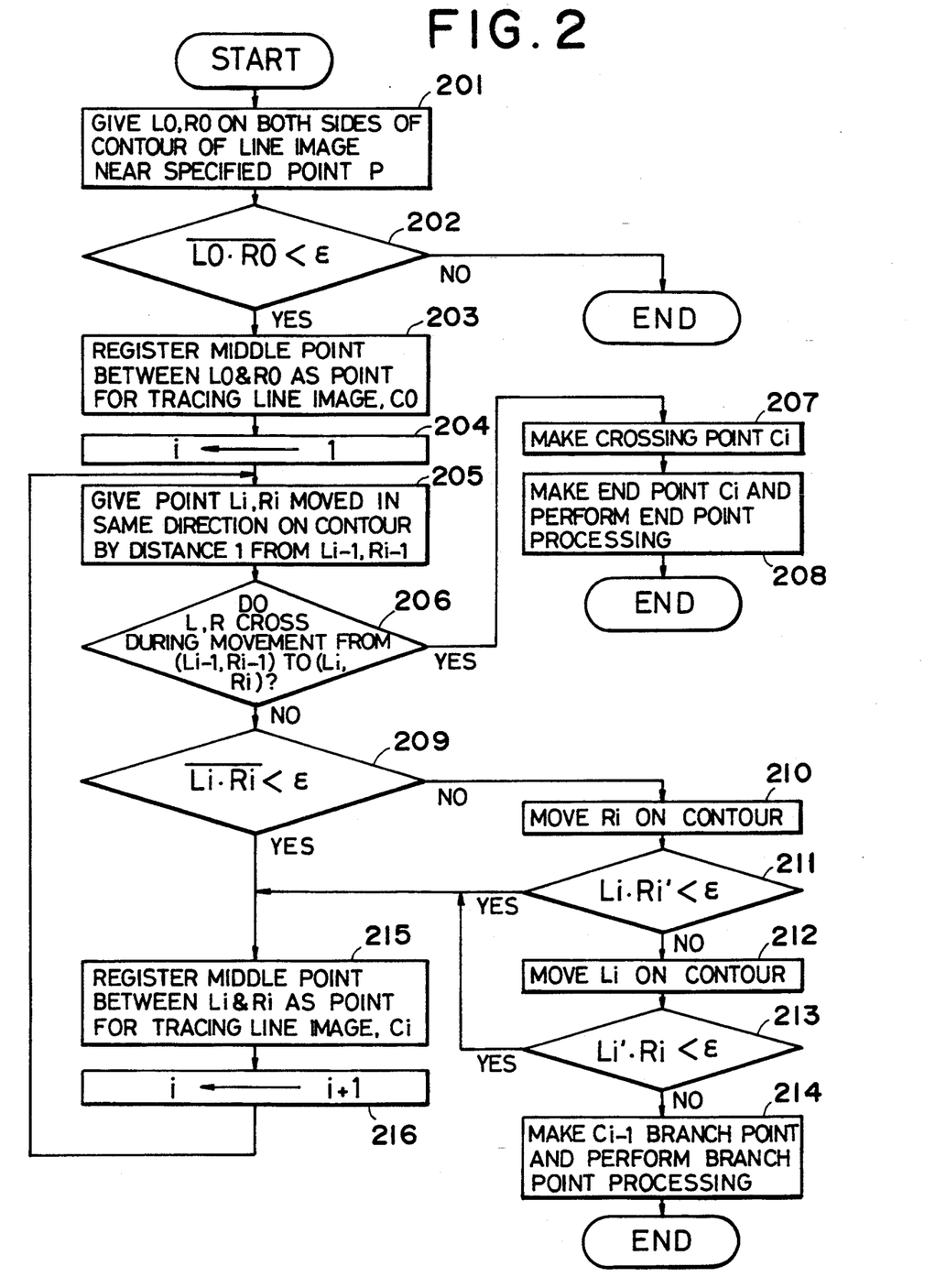
FIG. 2 is a flowchart showing the processing flow of the line image trace processing.

As described hereinabove, the processing of the flowchart as shown in FIG. 2 permits the line image to be traced while absorbing some noise on the contour of the line image and, at the same time, deciding the end points and branch points.

Figure 7:
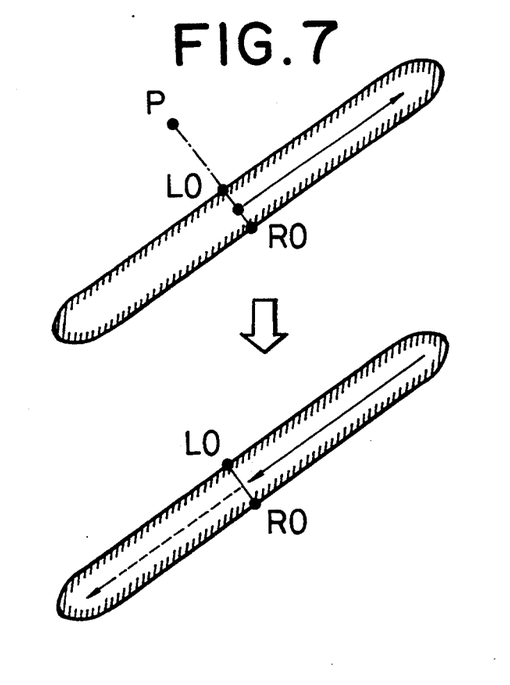
FIG. 7 is a schematic representation describing an example of the reverse trace processing in the line image trace processing.

Further, it can be noted that, although FIG. 2 shows the processing of the point P in one direction, it is possible to trace the line image in the opposite direction from the point P as a continuation from the final point traced in the first direction by reversing the order of the line image tracing points so far registered when the line image tracing has reached the end point or the like. This, illustrated in FIG. 7, eventually provides tracing data on the whole line image in the vicinity of the specified point P.

Figure 8:
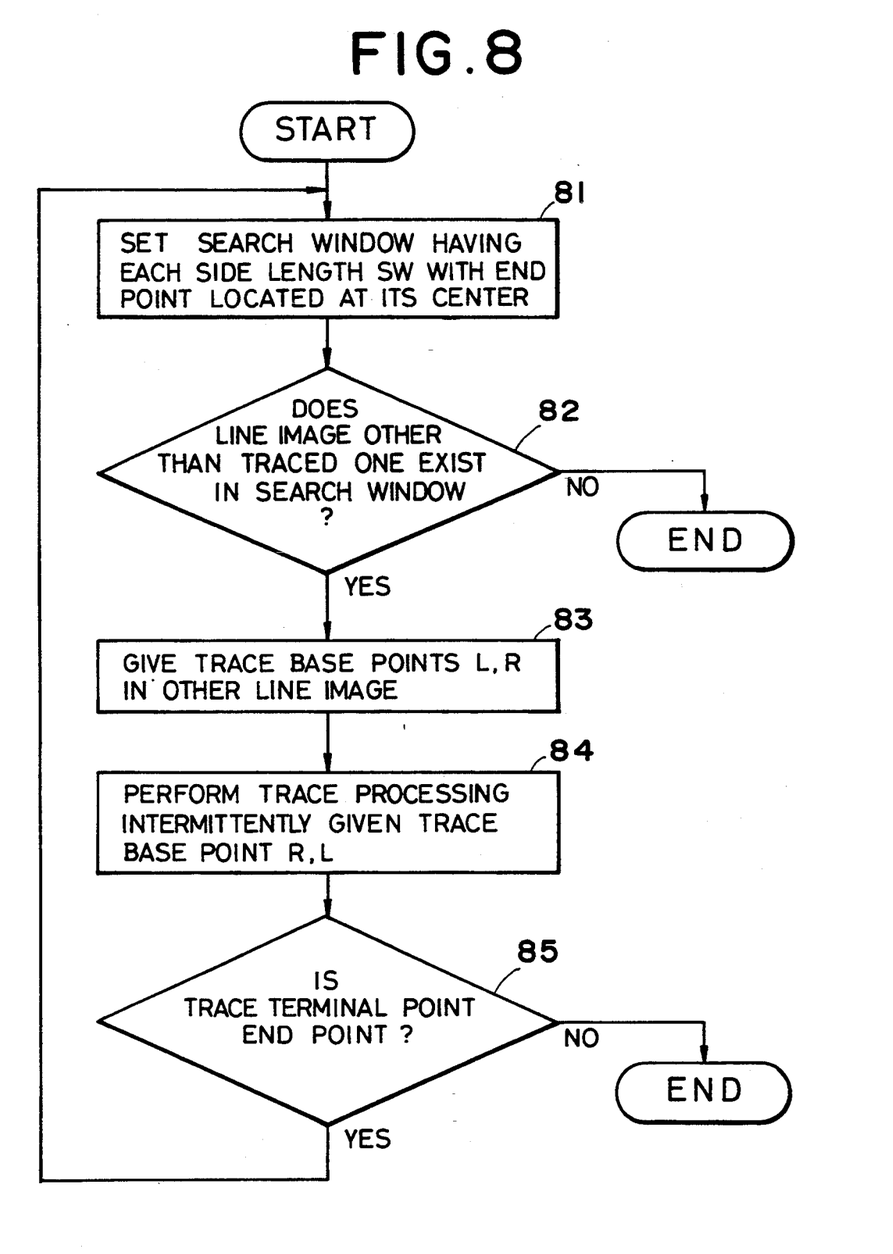
FIG. 8 is a flowchart showing an example of the processing flow of the line image trace processing which is performed by jumping a disconnected portion of the line image.
Figure 9:
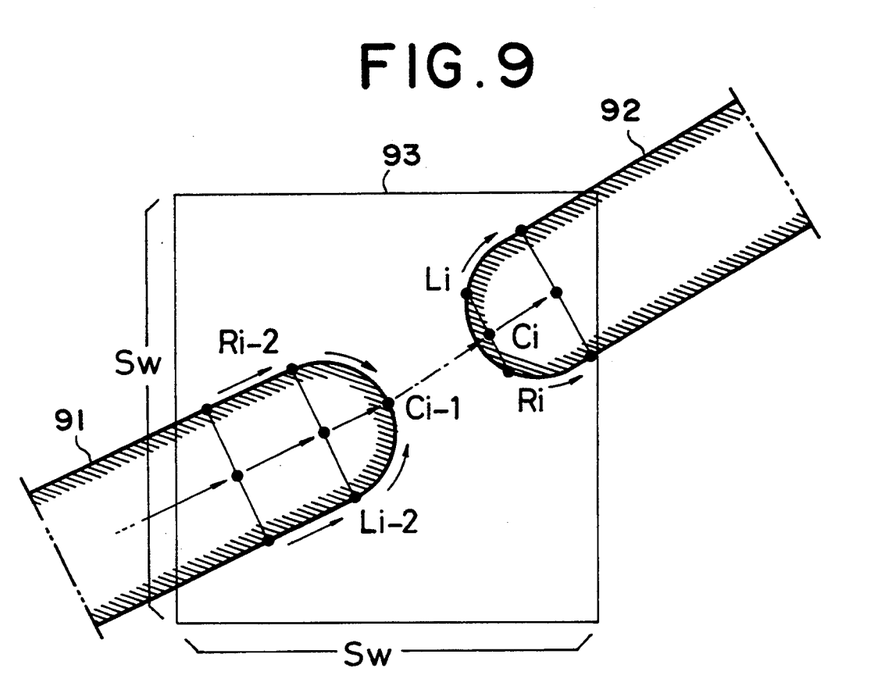
FIG. 9 is a schematic representation describing line image trace processing operations to be performed by jumping the disconnected portion of the line image.

Reference is now made to FIG. 8, which is a flowchart showing an example of the processing flow of the line image trace processing which is performed by jumping a disconnected portion of the line image, and to FIG. 9, which is a schematic representation describing line image trace processing operations to be performed by jumping the disconnected portion of the line image. The trace processing of the line image will be described with reference to FIGS. 8 and 9.

When it is decided at step 208 that the line image tracing point Ci has been regarded as the end point, then the program flow goes to step 81 at which a search window 93 having each side lengths Sw is set so that the end point Ci is located at the center of the window. Then, at step 82, a decision is made to determine if there is another line image within the window 93. If it is decided at step 82 that nothing but the line image so far traced exists within the window 93, then the processing is allowed to end. On the other hand, when the result of decision at step 82 indicates that another line image exists within the window, then the program flow goes to step 83 at which new trace base points Li and Ri are given on the contours of the new line image. In FIG. 9, the end point currently detected by tracing the line image 91 is designated as a point Ci-1 and the points Li and Ri are the trace base points on the new line image 92 to be traced, to which the point Ci-1 has jumped from the line image 91. Then, the trace base points Li and Ri are processed in substantially the same manner as shown in FIG. 2. When the final trace point is decided at step 85 to be a terminal point, then the program flow returns to step 81. The processing is otherwise allowed to end.

As described hereinabove, the line image tracing method according to the disclosed embodiment of the present invention can trace the line image with high efficiency, even if the line images would be discontinued. Further, this method can decide various characteristic points of the line image, such as end points, branch points, and loops of the line image, by continuing the tracing of the line image.

Further, the method according to the present invention regards a line image having line widths equal to or smaller than the predetermined line width as a line and converts it into line graphic data; however, it does not regard 1 line image having line widths larger than the predetermined line width as a line for conversion into line graphic data. In addition, the method according to the present invention can jump a discontinuity gap between two line images and continue the trace processing. Furthermore, the present invention is arranged so as to trace only the line image to be traced.

Hence, the method according to the present invention does not require a pre-processing of the line image, unlike the conventional line image tracing method, and can continue the tracing of the line image while absorbing some noise, if any, on the contours of the line image. Further, even if there would be a discontinuation between the line images or a hollow portion of the image, the line image trace processing can be continued. In addition, the method according to the present invention does not require special hardware and can perform the trace processing of the line image with high efficiency, even if the line image tracing is performed in a usually semi-automatic manner.

As described hereinabove, the line image tracing method according to the present invention can perform the line image trace processing highly efficiently because it does not require any pre-processing of the whole image in tracing the line image by the image processor, and appropriate measures can be taken for each trace processing while monitoring the states of the line image during the trace processing. Further, it can decide the end points and the branch points while tracing the line image, so that it requires the operator to decide which action to be taken during the trace processing, thereby executing the original function of the semi-automatic image trace processing system efficiently and performing efficient image processing.

The present invention has been described hereinabove by way of examples; it is to be understood accordingly that the present invention is not intended in any respects to be limited to the embodiments as described hereinabove, but it encompasses any variation and modification within the spirit and scope of the invention.

What is claimed is:

1. A method for tracing a line image using an image processor, comprising the steps of:
setting first and second points on respective first and second contour edges of a line image as first and second trace base points for the line image;
monitoring a distance relationship between the first and second trace base points as a line width of the line image while tracewise moving the first and second trace base points on the respective contour edges of the line image concurrently in the same direction; and
tracing the line image in accordance with the tracewise moving step so long as the line width determined in the monitoring step is equal to or smaller than a predetermined line width;
wherein the setting step includes the steps of:
selecting a nonimage point;
setting the first trace base point nearby the nonimage point on the first contour edge of the line image; and setting the second trace base point on the second contour edge of the line image nearby the nonimage point.

2. A method for tracing a line image using an image processor, comprising the steps of:

setting first and second points on respective first and second contour edges of a line image as first and second trace base points for the line image;

monitoring a distance relationship between the first and second trace base points as a line width of the line image while tracewise moving the first and second trace base points on the respective contour edges of the line image concurrently in the same direction; and tracing the line image in accordance with the tracewise moving step so long as the line width determined in the monitoring step is equal to or smaller than a predetermined line width;

wherein the tracing step includes the steps of:

determining a middle point between said first and second trace base points; and registering the middle point as a tracing point for tracing the line image.

3. A method for tracing a line image using an image processor, comprising the steps of:

setting first and second points on respective first and second contour edges of a line image as first and second trace base points for the line image;

monitoring a distance relationship between the first and second trace base points as a line width of the line image while tracewise moving the first and second trace base points on the respective contour edges of the line image concurrently in the same direction; and tracing the line image in accordance with the tracewise moving step so long as the line width determined in the monitoring step is equal to or smaller than a predetermined line width;

wherein, when said first and second trace base points intersect each other at an intersecting point during the tracewise moving on the contour edges of the line image, the intersecting point is registered as an end point.

4. A method for tracing a line image as claimed in claim 3, further comprising the steps of:

setting a square search window having a predetermined side length with the end point as a center of the search window;

searching for another line image within the search window;

if another line image is found within the search window during the searching step, setting two new trace base points on respective contour edges of the another line image; and performing the tracing step using the new trace base points on the contour edges of the another line image.

5. A method for tracing a line image using an image processor, comprising the steps of:

setting first and second points on respective first and second contour edges of a line image as first and second trace base points for the line image;

monitoring a distance relationship between the first and second trace base points as a line width of the line image while tracewise moving the first and second trace base points on the respective contour edges of the line image concurrently in the same direction; and tracing the line image in accordance with the tracewise moving step so long as the line width determined in the monitoring step is equal to or smaller than a predetermined line width;.

wherein, when said first and second trace base points are being tracewise moved on the contour edges of the line image and a distance between said first and second trace base points is larger than the predetermined line width, the tracing step is temporarily interrupted at an interrupt point, one of said first and second trace base points is moved within a predetermined range from the interrupt point to give a new trace base point while the other of said first and second trace base points is not moved, a distance between the other trace base point and the new trace base point is measured, and said tracewise moving step is performed with respect to said other trace base point and the new trace base point when the distance between the other trace base point and the new trace base point is not larger than the predetermined line width.

6. A method for tracing a line image using an image processor, comprising the steps of:

setting first and second points on respective first and second contour edges of a line image as first and second trace base points for the line image;

monitoring a distance relationship between the first and second trace base points as a line width of the line image while tracewise moving the first and second trace base points on the respective contour edges of the line image concurrently in the same direction; and tracing the line image in accordance with the tracewise moving step so long as the line width determined in the monitoring step is equal to or smaller than a predetermined line width;

wherein, when said first and second trace base points are tracewise moved on the contour edges of the line image and a distance between said first and second trace base points is larger than a predetermined line width, the tracewise moving of said first and second trace base points on the contour edges is temporarily interrupted at an interrupt point, one of said first and second trace base points is moved within a predetermined range from the interrupt point to give a new trace base point while the other of said first and second trace base points is not moved, a distance between the other trace base point and the new trace base point is measured, and said new trace base point is registered as a branch point when a distance between the other trace base point and the new trace base point is larger than the predetermined line width.

* * * * *